United States Patent [19]

Russo

[11] 4,085,072
[45] Apr. 18, 1978

[54] PROCESS FOR PREPARING OXIDATIVELY STABLE POLYURETHANE FOAM

[75] Inventor: Robert V. Russo, Brooklyn, N.Y.

[73] Assignee: M&T Chemicals Inc., Stamford, Conn.

[21] Appl. No.: 641,963

[22] Filed: Dec. 18, 1975

[51] Int. Cl.[2] .............................................. C08G 18/24
[52] U.S. Cl. ......................... 260/2.5 AC; 260/2.5 AB
[58] Field of Search ................... 260/2.5 AB, 2.5 AC, 260/77.5 AB, 77.5 AC

[56] References Cited

U.S. PATENT DOCUMENTS

| 3,164,557 | 1/1965 | Merten | 260/2.5 AB |
| 3,311,648 | 3/1967 | Herbstman | 260/2.5 AB |
| 3,775,376 | 11/1973 | Bircher | 260/2.5 AC |
| 3,822,223 | 7/1974 | Gemeinhardt | 260/2.5 AC |

FOREIGN PATENT DOCUMENTS

| 1,111,377 | 7/1961 | Germany | 260/2.5 AB |
| 936,395 | 9/1963 | United Kingdom | 260/2.5 AB |
| 1,003,201 | 9/1965 | United Kingdom | 260/2.5 AB |

*Primary Examiner*—C. Warren Ivy
*Attorney, Agent, or Firm*—Kenneth G. Wheeless; Robert Spector

[57] ABSTRACT

Flexible cellular polyurethane exhibiting excellent thermal and oxidative stability can be prepared using specified complexes of organotin halides or pseudo halides with amines, phosphines or phosphine oxides as latent polymerization catalysts. These catalysts also eliminate the shrinkage that often characterizes cellular polyurethanes prepared using organotin compounds as the polymerization catalyst.

1 Claim, No Drawings

PROCESS FOR PREPARING OXIDATIVELY STABLE POLYURETHANE FOAM

BACKGROUND

This invention relates to the preparation of polyurethane foarms. This invention further relates to the use of certain latent organotin catalysts to prepare urethane foams that exhibit a high level of oxidative stability, particularly at elevated temperatures, relative to products obtained using other conventional organotin catalysts.

Flexible polyurethane foams are widely used in the manufacture of furniture, particularly seat cushions, and as packaging material for delicate instruments and other articles that are susceptible to damage during handling and transit. If the foam is incorporated into a piece of furniture or other durable product, the foam must withstand exposure of several years or longer to elevated temperatures, atmospheric oxygen, or both without undergoing significant degradation as evidenced by a gradual loss of structural strength, which may culminate in disintegration of the foam.

It is well known to prepare cellular polyurethanes by reacting polyols containing two or more reactive hydrogen atoms, as determined by the Zerewitinoff method, with polyfunctional isocyanates in the presence of a polymerization or gel catalyst and a blowing agent such as water or a relatively low boiling fluorinated hydrocarbon. A surfactant is often included in the reaction mixture together with a blowing catalyst to obtain the desired small, uniform cell size within the foam.

U.S. Pat. No. 3,620,985 discloses that both divalent and tetravalent tin compounds are effective gel catalysts for cellular polyurethanes. The divalent tin compounds, exemplified by stannous salts of carboxylic acids such as stannous octoate, are so susceptible to oxidation that they decompose relatively rapidly in the presence of air. Special handling and storage of these stannous compounds are therefore required to retain their activity as catalysts. Compounds of the formula $R_aSnX_{4-a}$ wherein R is typically butyl or other alkyl radical containing from 1 to 20 carbon atoms and X is halogen or other anionic radical are less than satisfactory for preparing flexible foams that are exposed to atmospheric oxygen, elevated temperatures, i.e. above about 50° C. or both over extended periods of time. Under these conditions the foams may lose resiliency and structural integrity, sometimes to the extent that they disintegrate when compressed. This is particularly true for those foams derived from polyols that are reaction products of propylene oxide and glycerine. These polyols may also contain end groups derived from ethylene oxide to obtain hydroxyl groups bonded to primary rather than secondary carbon atoms. Polyurethanes derived from polyols that contain side chains resulting from the graft polymerization of acrylonitrile, styrene or other vinyl monomer onto a poly(propylene oxide) backbone are usually less susceptible to oxidative and thermal degradation, and are therefore employed to prepare high resiliency foams. However, in the presence of conventional organotin gel catalysts even these products undergo a significant decrease in structural strength and become brittle following prolonged exposure to oxygen and/or heat.

Organotin compounds are typically very active catalysts for the reaction of isocyanates with polyols. Often the reaction is so rapid that the liquid formulation employed to prepare the foam solidifies before it can flow into every part of the mold or other container into which it is poured or before the gas generated by the blowing agent is able to escape. The volume of the entrapped gas contracts as the foam cools, resulting in shrinkage. In either instance, the dimensions of the final foam product do not coincide with those of the mold in which it is formed, and the product is rejected. The range of useful catalyst concentration for conventional foam is relatively narrow, usually between 0.25 and 0.35 part of catalyst per 100 parts of polyol. The range for high resiliency foams is slightly broader, usually between 0.01 and 0.05 part.

An objective of this invention is to improve the resistance to oxidative degradation of polyurethane foams prepared using tetravalent organotin compounds as the gel catalyst. A second objective is to reduce shrinkage and extend the useful range of gel catalyst concentration, thereby permitting a wider variation in processing conditions. Surprisingly it has now been found that if the organotin compound is added to the foam formulation as a complex with a tertiary amine, tertiary phosphine or tertiary phosphine oxide, the resultant foam exhibits improved oxidative stability relative to a foam prepared using the non-complexed organotin compound as the gel catalyst.

SUMMARY OF THE INVENTION

This invention provides a method for preparing a flexible cellular polyurethane exhibiting improved oxidative stability and reduced shrinkage by reacting a polyol containing at least two active hydrogen atoms per molecule, as determined by the Zerewitinoff method, with a polyfunctional isocyanate, the reaction being conducted in the presence of a blowing agent, a blowing catalyst and an effective amount of a latent gel catalyst exhibiting a formula selected from the group consisting of $R_aSnX_{4-a}\cdot bNR'_3$,

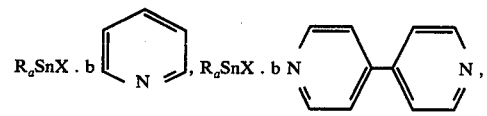

$R_aSnX_{4-a}\cdot PR'_3$ and $R_aSn_{4-a}\cdot O=PR'_3$ wherein R and R' are individually selected from the group consisting of alkyl containing from 1 to 20 carbon atoms, cycloalkyl and phenyl, X is selected from the group consisting of chlorine, bromine, iodine, cyanate and thiocyanate and a and b are each 1 or 2.

DETAILED DESCRIPTION OF THE INVENTION

The present latent gel catalysts are useful for preparing flexible polyurethane foams from substantially all of the known polyols, polyfunctional isocyanates and blowing agents. The concentration of these catalysts is usually between 0.005 and 1%, based on the weight of polyol. These catalysts are complexes formed between an organotin halide or pseudohalide of the formula $R_aSnX_a$, wherein R, X and a are as defined hereinbefore, and a stoichiometric amount of a Lewis base, which may be a tertiary amine, $R'_3N$, a tertiary phosphine, $R'_3P$ or a tertiary phosphine oxide, $R'_3P=O$. These types of complexes are reported in the chemical literature. A chapter devoted to this subject is contained in a text by R. C. Poller entitled "The Chemistry of Organotin Compounds" (Academic Press, New York, 1970). Depending upon steric hinderance in the area of the nitrogen atom and other factors, the molar ratio of organotin compound to amine is 1:1 or 1:2, respectively. For phosphines and phosphine oxides the molar ratio of the two components that constitute the complex is usually 1:1.

Formation of the complex usually occurs rapidly once the two components are combined. The complexes are conveniently prepared by separately dissolving the organotin compound and the complexing agent in the same or miscible solvents and combining the two solutions. If both reagents are liquid, the preparation can be conducted in the absence of solvent. It may be desirable to heat the resultant mixture to a temperature between 30° C. and the boiling point for several minutes or hours as required to ensure that the reaction is complete. Advantageously any solvent medium selected is one in which the complex is insoluble and can readily be isolated by filtration or decantation. If the complex is soluble in the reaction medium it can be recovered by adding a miscible non-solvent or by removing at least a portion of the solvent by distillation, preferably under reduced pressure.

Amines which form relatively stable complexes with organotin halides or pseudohalides do not contain any hydrogen atoms bonded to the nitrogen atoms. The three carbon atoms on the nitrogen atom are each part of an alkyl radical containing from 1 to 20 carbon atoms or a phenyl radical. Alternatively, four or five carbon atoms and the nitrogen atom can form a heterocyclic ring. If the ring contains aromatic unsaturation, such as is present in pyridine, no other substituents are present on the nitrogen atom. The amine can be monofunctional or polyfunctional, an example of the latter being triethylene diamine. Phosphines and phosphine oxides wherein the nitrogen atom of an amine is replaced by a phosphorus atom or $\equiv P=O$ will also form complexes with organotin halides and pseudohalides. These complexes are effective latent gel catalysts and are encompassed by the accompanying claims.

The present complexes are stable at ambient temperatures, which usually are between 22° and 27° C. The heat generated during the reaction between the isocyanate and the polyol rapidly increases the temperature of the reaction mixture to between 75° and 150° C. It is within this temperature range that the present latent catalysts decompose, forming an organotin halide or pseudohalide and a tertiary amine, phosphine or phosphine oxide.

When R and R' of the foregoing formulae represent alkyl they can be methyl, ethyl, n-propyl, iso-propyl, n-butyl, sec-butyl, tert-butyl, neopentyl, n-amyl, iso-amyl, n-hexyl, n-heptyl, n-octyl, n-decyl, dodecyl or eicosanyl, among others, and contain from 1 to 20 carbon atoms. Alternatively, R or R' can be phenyl or a cyloalkyl structure containing 5, 6, 7 or 8 carbon atoms.

Flexible polyurethane foams of improved oxidative stability are prepared by reacting a polyfunctional isocyanate with a polyol containing two or more reactive hydrogen atoms as determined by the Zerewitinoff method. This polymerization reaction is catalyzed by the organotin halide or pseudohalide formed upon decomposition of the present latent catalysts. This polymerization reaction occurs concurrently with gas evolution, resulting in formation of a cellular structure. The gas-evolving or blowing agent can be water, which reacts with excess polyfunctional isocyanate to yield carbon dioxide. Water can be used in combination with a volatile liquid fluorinated hydrocarbon such as trichlorofluoromethane. When water is present as a blowing agent the reaction mixture may also contain a catalyst for the blowing or foaming reaction to achieve the coordination between foaming and polymerization reactions that is required to achieved the desired uniformly small cell size within the foam. Tertiary amines such as N,N-dimethylamino ethyl ether and triethylene diamine are preferred blowing catalysts. One tenth of one part of blowing catalyst is usually employed for every one hundred parts of polyol. Silicone compounds, particularly reaction products of silanes with 1,2-olefin oxides, are often included as cell modifying agents.

If one or more amines are employed as blowing catalysts, these will also catalyze the reaction between the polyfunctional isocyanate and polyol. Amines therefore act in combination with the organotin compounds formed upon decomposition of the present latent gel catalysts. The use of amines as gel catalysts is well known in the prior art, however foams prepared using these catalysts are often less than satisfactory due to the low activity of amines as gel catalysts. In the past it was necessary to employ a prepolymer in order to attain the desired molecular weight and avoid unduly long rise times.

The polyfunctional isocyanates used to prepare polyurethanes using the present gel catalyst include both polyisocyanates and polyisothiocyanates. While the invention is described with specific references to the reaction of certain diisocyanates, it is generically applicable to the reaction of any compound containing two or more $-N=C=G$ radicals wherein G is oxygen or sulfur. Compounds within this generic definition include polyisocyanates and polyisothiocyanates of the formula $R^5(NCG)_x$ in $x$ which is 2 or more. $R^5$ can be alkylene, substituted alkylene, arylene, substituted arylene or other divalent hydrocarbon radical that may optionally contain one or more aryl-NCG bonds and one or more alkyl-NCG bonds.

Although a variety of organic polyisocyanates containing 3 or more isocyanate radicals per molecule can be used in the practice of this invention, diisocyanates are usually preferred in flexible foam formulations. Suitable isocyanates include alkylene diisocyanates such as hexamethylene diisocyanate, and decamethylene diisocyanate, the isomeric tolylene diisocyanates and naphthalene diisocyanates, 4,4'-diphenylmethane diisocyanate and mixtures of two or more of the foregoing diisocyanates. Triisocyanates obtained by reacting 3 moles of an arylene diisocyanate for each mole of a triol, e.g. the products formed from 3 moles of tolylene diisocyanate and 1 mole of hexane triol may also be present in the reaction mixture. A preferred polyisocyanate is a mixture of tolylene diisocyanates containing 80 percent by weight of the 2,4-isomer and 20 percent of the 2,6-isomer. Other suitable polyfunctional isocyanates include hexamethylene diisocyanate, xylylene diisocyanate, 1-methyl-2,4-diisocyanate-cyclohexane, phenylene diisocyanates, chlorophenylene diisocyanates, diphenylmethane-4,4'-diisocyanate, naphthalene-1,5 diisocyanate, triphenylmethane-4,4'4"-triisocyanate and xylene-α,α'-diisothiocyanate. Oligomeric and polymeric isocyanates of the general formulae $(R^7NCG)_x$ and $[R^7(NCG)_x]_y$ in which $x$ and $y$ are between 2 and 10, are also useful in the present method, as are compounds of the general formula $M(NCG)_x$ wherein $x$ is 2 or more and M is a difunctional or polyfunctional atom or group. Examples of this type include ethylphosphonic diisocyanate, $C_2H_5P(O)(NCO)_2$, phenylphosphonic diisocyanate, $C_6H_5P(NCO)_2$, compounds containing a $\equiv Si-NCO$ group, isocyanates derived from sulfonamides ($R_7SO_2NCO$), cyanic acid, and thiocyanic acid.

Suitable polyalkylene polyols contain two or more active hydrogen atoms as determined by the Zerewitinoff method.

These polyols are liquids which typically exhibit an average molecular weight of between about 500 and 5000 and include hydroxyl-containing polyesters, polyethers and amides, alkylene glycols, polymercaptans, polyamines and polyisocyanate-modified alkylene glycols. The class of hydroxyl-containing polyesters includes fatty acid glycerides having hydroxyl numbers between 50 and 75, such as castor oil, hydrogenated castor oil and "blown" natural oils. Hydroxyl-terminated polyesters can be obtained by the esterification-condensation reaction of aliphatic dibasic carboxylic acids with glycols, triols or mixtures thereof, in proportions such that most of all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a polyhydroxylated compound such as ethylene glycol, diethylene glycol or trimethylol propane, among others.

Hydroxyl-terminated polyethers, a preferred type of polyalkylene polyol, include polyalkylene glycols, e.g. polyethylene glycols and polypropylene glycols. The molecular weight of these compounds is preferably between abut 200 and 5000.

Another class of polymers having terminal reactive hydroxyl groups are lactone polymers, preferably those exhibiting molecular weights within the range of 500 to 10,000.

The present method is particularly suitable for the reaction of organic polyisocyanates with high molecular weight polyols containing two or more reactive hydroxyl radicals.

The preparation of polyether based urethane foams can be carried out by forming a prepolymer, i.e. pre-reacting molar equivalents of the hydroxyl-terminated polyether and isocyanate in the absence of water and thereafter producing a foam by the addition of excess isocyanate, water and optionally other blowing agents and one of the present gel catalysts. Aternatively, foams may be produced by the "one-shot" method in which all of the reactants and catalysts are mixed together and allowed to react in the presence of water or other blowing agent.

The polyfunctional isocyanate is typically present in an amount of 5 to 300 percent, preferably about 40 percent by weight of the polyol. Water may optionally be present as a blowing agent to react with excess isocyanate and generate sufficient carbon dioxide to produce a foam of the desired density. The amount of water is between 1 and 10 percent, preferably between 3 and 5 percent, based upon the weight of the polyol.

The amount of isocyanate used can be in excess of the stoichiometric amount required to react with the active hydrogen atoms present in the polyol and any water present, thereby forming allophanate

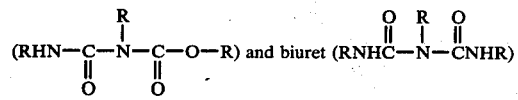

linkages in the polymer chains. Depending upon the desired density of the urethane foam and the amount of crosslinking desired, the ratio of isocyanate equivalents to equivalents of active hydrogen should be 0.8 to 1.2, respectively, preferably between 0.9 and 1.1.

The mixture of the present latent gel catalyst and one or more blowing catalysts is present in an amount corresponding to 0.01 to 10 parts by weight per 100 parts of polyol. Preferably the latent gel catalyst is present in an amount corresponding to between 0.005 and 1.0 parts by weight per 100 parts of polyol.

The following examples demonstrate the oxidative stability that distinguishes flexible foams prepared using the present latent gel catalysts from those obtained using conventional organotin compounds. All parts and percentages are by weight unless otherwise specified.

EXAMPLE A

A complex was prepared by dissolving 139 g. (0.5 mole) of triphenylphosphine oxide in 200 cc. of benzene. To the resultant solution was gradually added 110 g. (0.5 mole) of dimethyltin dichloride with stirring. A solid was observed to precipitate. The mixture was stirred for one hour at 25° C. and the white solid recovered by filtration and dried. Upon analysis the solid was found to contain 23.9% tin and 14.1% chlorine. The calculated values for a 1:1 complex between triphenylphosphine oxide and dimethyltin dichloride is 23.9% tin and 14.3% chlorine.

The foregoing procedure was repeated using 139 g. (0.5 mole) of the phosphine oxide and 141 g. (0.5 mole) of butyltin trichloride. The analysis for tin and chlorine were as follows:

Sn = 21.2% (calculated); 21.4% (found). Cl = 19.0% (calculated; 18.7% (found).

EXAMPLE 1

A masterbatch or premix was prepared by combining 500 parts of a trifunctional glycerol based polypropylene glycol exhibiting an average molecular weight of 3000, 17.5 parts water, 1.5 parts N-ethyl morpholine, 1.5 parts of a 33% solution of triethylene diamine in dipropylene glycol and 5.0 parts of a poly(oxyethylene oxypropylene)siloxane available as Niax ® L-550 from the Union Carbide Chemical Corporation. The mixuture was stirred at high speed for about 2 minutes, then was allowed to remain undisturbed for about 16 hours, during which time a clear solution formed. A 52.55 gram aliquot of the solution was placed in a 6 oz. (177 cc.)-capacity polyethylene-lined paper cup together with the gel catalyst, and stirred at high speed for five seconds, 22.5 g. of tolylene diisocyanate (80% of 2,4-isomer and 20% of 2,6-isomer) were then added and the resultant mixture poured into a one liter capacity polyethylene-lined paper cup. The time intervals required for the onset of polymerization (cream time) and for completion of the ensuing foam formation (rise time) were noted and are recorded in the accompanying table together with the type and concentration of gel catalyst present in each of the samples. A longer cream time is desirable, since this lengthens the interval during which the formulation can flow freely to fill all portions of the container in which the foam will rise. Each of the cylindrical foam samples was cut in half lengthwise and one of the halves tested for oxidative and thermal stability. The sample to be tested was placed in a circulating air oven at a temperature of 140° C. for 22 hours, then withdrawn from the oven and allowed to cool for between 10 and 15 minutes. A portion of the flat surface of each sample was depressed to the maximum extent and the pressure released almost immediately. Samples that were sufficiently resilient to recover their original shape without any visible damage were considered to have passed the test and all others were considered failures.

Stannous octoate, a conventional gel catalyst, was employed as a control. While this compound is an effective catalyst, it is hydrolytically and oxidatively unstable. Special precautions must therefore be exercised during the storage and use of this catalyst to avoid contact with even the small amount of moisture present in the atmosphere. The present latent gel catalysts are equivalent in performance to stannous octoate and are hydrolytically stable. A foam prepared using uncomplexed dibutyltin dichloride exhibited an equivalent rise time but failed the heat test.

TABLE I

| GEL CATALYST | CONCENTRATION (g.) | HEAT TEST RESULT | CREAM TIME (seconds) | RISE TIME (seconds) |
|---|---|---|---|---|
| Stannous octoate control | 0.15 | Pass | 16 | 134 |
| $(C_4H_9)_2SnCl_2$ | 0.11 | Fail | 16 | 130 |
| $(C_4H_9)_2SnCl_2 \cdot \phi_3P=O$ | 0.21 | Pass | 30 | 136 |

The complex between dibutyltin dichloride and triphenylphosphine oxide was prepared by adding 152 g. (0.5 mole) of molten dibutyltin dichloride at a temperature of 75° C. to a solution containing 139 g. (0.5 mole) of triphenylphosphine oxide dissolved in 200 cc. of benzene. The addition was performed under a nitrogen atmosphere and the resultant mixture was stirred for one hour at ambient temperature. The benzene was then removed under reduced pressure, yielding 280 g. (90% of theoretical yield) of a solid material. Analysis revealed that the solid contained 13.7% tin and 8.07% chlorine. The calculated values for tin and chlorine content are 13.8% and 8.24%, respectively. This crude material was evaluated as the gel catalyst for a flexible polyurethane foam using the preceding formulation.

The following examples disclose representative organotin complex encompassed by the accompanying claims and demonstrate the efficacy of these complexes as latent gel catalysts for flexible polyurethane foams.

EXAMPLE 2

A complex between triphenylphosphine oxide and dibutyltin dithiocyanate was prepared by combining 34.91 g. (0.1 mole) of dibutyltin dithiocyanate with 200 g. of benzene with stirring under a nitrogen atmosphere. To the resultant slurry was added a second slurry containing 27.83 g. (0.1 mole) of triphenylphosphine oxide and 50 g. of benzene. Once the two slurries were combined the solid phase dissolved to form a clear, pale pink solution. The solution was warmed for several minutes to ensure that the reaction was complete. The benzene was then removed under reduced pressure, yielding 61.7 g. of a pale yellow oil which solidified upon standing for 21 days at room temperature to form a light gray, waxy material. A 33% by weight solution of this material in a polypropylene glycol (Pluracol ® P-410) was evaluated as a gel catalyst using the formulation disclosed in Example 1. The concentration of the catalyst was 0.5 part per 100 parts of polyol. The cream and rise times of the resultant foam were 27 seconds and 145 seconds, respectively.

EXAMPLE 3

A complex between triphenylphosphine and dibutyltin dichloride was prepared by adding a solution containing 30.38 g. (0.1 mole) of dibutyltin dichloride and 42.0 g. of benzene to a second solution containing 26.49 g. (0.1 mole) of triphenylphosphine and 46.5 g. of benzene. The solutions were combined under a nitrogen atmosphere and heated to the boiling point for 1.5 hours, at which time the benzene was removed under reduced pressure. The residue, a yellow liquid, solidified upon standing and weighed 56 g. A 50% by weight solution of this material in a polypropylene glycol (Pluracol ® P-410) was evaluated as a gel catalyst using the formulation disclosed in Example 1 and a gel catalyst concentration of 1.0 part per 100 parts of polyol. The cream time and rise times of the foam were 26 and 135 seconds.

EXAMPLE 4

A complex between dibutyltin dichloride and dipyridyl was prepared by adding a solution containing 15.6 g. (0.1 mole) of 2,2'-dipyridyl and 45 g. of benzene to a slurry containing 34.6 g. of dibutyltin dithiocyanate and 120 g. of benzene. The addition was performed with stirring under a nitrogen atmosphere. An exothermic reaction occurred, following which the mixture was heated to the boiling point for 20 minutes. The solid obtained following removal of the excess benzene under reduced pressure weighed 52.3 g. A 25% by weight solution of this material in a liquid polypropylene glycol was evaluated as a gel catalyst using the formulation of Example 1 with a gel catalyst concentration of 2.0 parts per 100 parts of the polyol component. The cream and rise times were 26 and 153 seconds, respectively.

What is claimed is:

1. A method for preparing an improved flexible cellular polyurethane by reacting a polyol containing at least two active hydrogen atoms per molecule, as determined by the Zerewitinoff method, with a polyfunctional isocyanate, the reaction being conducted in the presence of a blowing agent and an effective amount of a latent gel catalyst of a formula selected from the group consisting of

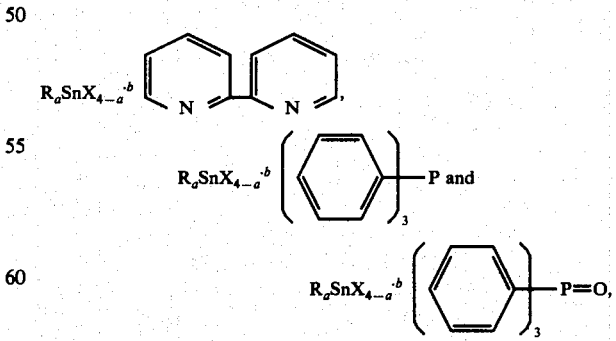

selected from the group consisting of alkyl containing from 1 to 20 carbon atoms, cycloalkyl and phenyl, X is selected from the group consisting of chlorine, bromine, iodine, cyanate and thiocyanate and a and b are each 1 or 2.

* * * * *